000
United States Patent Office
3,422,075
Patented Jan. 14, 1969

3,422,075
POLYMERS MODIFIED WITH A MONO-SULFONYL ISOCYANATE
Lloyd D. Taylor, Everett, Mass., assignor to Polaroid Corporation, Cambridge, Mass., a corporation of Delaware
No Drawing. Filed July 1, 1966, Ser. No. 562,081
U.S. Cl. 260—77.5        8 Claims
Int. Cl. C08b 15/06; C08f 27/10

ABSTRACT OF THE DISCLOSURE

The disclosure relates to acidic polymers prepared by reacting a hydroxy or amino-containing polymer with a monosulfonyl isocyanate. The polymers are soluble in alkaline solution, are resistant to hydrolysis, and are useful as film-forming materials, coatings, thickening agents, alkali-soluble detergent-resistant wax materials and as replacements for carboxy-functional resinous materials.

---

The present invention relates to novel polymeric materials and more particularly with novel monosulfonyl isocyanate modified polymeric materials to provide thereon an acidic side chain which is capable of conferring on the material solubility in alkaline solution and which side chain is substantially stable therein. The present invention also relates to a method of effecting the above modification, and particularly, without the necessity of using forced reaction conditions.

One object of the present invention is the provision of novel monosulfonyl isocyanate modified polymeric materials.

Another object of the present invention is to provide a method of providing the aforementioned polymers.

A further object is a method of providing the aforementioned polymers without the necessity of using forced reaction conditions.

Other objects of the invention will in part be obvious and will in part appear hereinafter.

The invention accordingly comprises the method involving the several steps and the relation and order of one or more of such steps with respect to each of the others, and the product possessing the features. properties and the relation of elements which are exemplified in the following detailed disclosure, and the scope of the application of which will be indicated in the claims.

For a fuller understanding of the nature and objects of the invention, reference should be had to the following detailed description.

In accordance with the present invention, a novel polymeric material is provided which is acidic but which resists hydrolysis and is stable in alkaline solution for extended periods of time. The novel polymeric material is the reaction product of a polymer having hydroxyl or amine functionality with a monosulfonyl isocyanate of the formula: R—SO₂—N=C=O wherein R may be halogen, such as chlorine, fluorine, bromine, or iodine; a non-functional organic radical selected from the group consisting of alkyl, preferably lower alkyl of less than 10 carbon atoms; halogen-substituted alkyl; phenyl; substituted phenyl and a five or six membered heterocyclic ring such as pyridyl, thiazolyl and benzimidazolyl. R is preferably phenyl and more preferably, an alkyl substituted phenyl group, e.g., a toluene group The reaction of a hydroxyl functional or amine functional polymer and the sulfonyl isocyanate produces a derivative group on the polymer chain having the following structure:

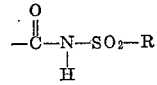

wherein R is the same as above.

In each case, the hydrogen atom attached to the nitrogen atom between the carbonyl group and the sulfonyl group is unexpectedly highly acidic and functions to confer on the polymeric material solubility in alkaline solution. The derivative group on the polymer chain is stable in alkaline solution and does not hydrolyze after extensive alkaline contact so that these modified polymeric materials may be allowed to remain in contact with alkaline solutions for extended periods of time without fear of rapid deterioration.

The monsulfonyl isocyanate is reacted with a polymer having hydroxyl or amine functionality. Examples of these materials are cellulose, cellulose monoacetate, cellulose diacetate, polyvinyl alcohol, polyhydroxy methylene, the hydrolysis product of a copolymer of vinyl acetate and vinyl pyrrolidone, etc. Any polymer which has hydroxyl or amine functionality which is reactable with the isocyanate group of the sulfonyl isocyanate material is usable in the present invention and is intended to be included within the scope of the present invention.

Generally speaking, there is no restriction on the choice of the monosulfonyl isocyanate and most monosulfonyl isocyanates of the formula R—SO₂—N=C=O are usable in the present invention. The R group of the monosulfonyl isocyanate is sufficiently isolated from the isocyanate moiety as to have little effect on its reactivity and therefore there is no limitation of the choice of the monosulfonyl isocyanate from this standpoint. However, an R group of extensive size may affect the alkali solubility characteristics of the modified polymer and monosulfonyl isocyanates having alkyl groups, for instance, of larger than 10 carbon atoms are to be avoided for this reason.

The R group may also be used to confer added properties to the polymer. Thus for example, to improve the hydrophobic characteristics of a polymer material, one may use a monosulfonyl isocyanate with a hydrophobic R group.

Sulfonyl isocyanates which may be used to form the polymeric materials of the present invention may be illustrated by the following examples: tolyl sulfonyl isocyanate, phenyl sulfonyl isocyanate, methyl sulfonyl isocyanate, trifluoromethyl sulfonyl isocyanate, pyridyl sulfonyl isocyanate, thiazolyl sulfonyl isocyanate, benzimidazolyl sulfonyl isocyanate, etc.

To form the polymeric materials of the present invention, the monosulfonyl isocyanate is reacted with the polymer having the hydroxyl or amine functionality. It has been surprisingly found, due to the extremely reactive nature of the isocyanate group attached to the sulfonyl group, that the reaction between the polymer and the monosulfonyl isocyanate will proceed substantially to completion at room temperature in the absence of catalysis. Due to this fact, hydroxyl or amine functional polymers which are heat degradable, heat cross-linkable or otherwise heat sensitive can be easily modified in accordance with the procedure of the present invention to provide a modified polymer having an acidic group which confers solubility in alkaline solution on the polymer and which group is stable in an alkaline solution. While the reaction between the monosulfonyl isocyanate and the polymer will proceed at room temperature in the absence of catalysis to substantial completion for most polymeric materials, heat and/or the use of a catalyst, such as triethyl amine, may be used to induce reaction in instances where the functional reactive groups on the polymers are hindered in such a manner as to make their reaction difficult.

The reaction may be conducted in any solvent in which the polymeric material is soluble. Exemplary of solvents for use with polymeric materials such as cellulose diacetate and polyvinyl alcohol are chloroform, acetone, etc. The reaction is preferably conducted by admixing the two reactants in the presence of the solvent in a reaction vessel wherein they are allowed to react, preferably under slight agitation. The monosulfonyl isocyanate may also be added incrementally to the polymeric solution to effect reaction.

The total amount of monosulfonyl isocyanate which is reacted with the hydroxyl or amine functional polymeric material is dependent on the amount or acidity which is desired to be introduced into the polymer or on the solubility characteristics which are desired in the final product. For a polymer which is not soluble in alkaline solution numerous side chains may have to be introduced into the polymer to effect solubility. In some instances, where it is desired to have a polymer which is only alkali swellable, lesser amounts of acidic side chains are required so that an amount of monosulfonyl isocyanate less than that needed for total solubility need be reacted with the polymer. The amount of monosulfonyl isocyanate needed to produce the desired acidity in any situation can be easily determined by experimentation.

It is also contemplated to include within the scope of the present invention an in situ reaction between the monosulfonyl isocyanate and solid polymers having hydroxyl or amine functionality, as for example, when the polymer is shaped or formed into sheets, molded products, etc. Due to the extremely reactive nature of the sulfonyl isocyanate group, it is possible to modify formed objects, such as cellulosic sheets to improve their physical and chemical characteristics. For example, cellulosic sheets may be immersed in or coated with a monosulfonyl isocyanate compound having a hydrophobic R group to improve the water repellent characteristics thereof.

As set forth hereinbefore, the modified polymeric materials of the present invention are acidic and are soluble in basic or alkaline solutions similar to any other acidic material. The term alkaline solution is intended to include alkali metal hydroxide solutions formed from such materials as sodium and potassium hydroxide; ammonium hydroxide solutions; organic amine solvents and any other solvent or solution which is capable of solubilizing the modified polymeric material through an acid-base salt forming reaction.

The polymeric materials of the present invention are useful as film forming materials, coatings, thickening agents, alkali soluble-detergent resistant wax materials, and for most other uses to which acidic, alkaline soluble materials may be presently put to use. Due to the acidic nature of these polymeric materials, they are useful for replacements for carboxyl functional resinous materials. They may also be used in the formation of image-receiving layers for use in photographic diffusion transfer processes.

The present invention will be illustrated in greater detail in connection with the following examples which set out respective embodiments which, however, are not limited to the details set forth therein and are intended to be illustrative.

Example 1

15.5 grams (0.1 mole) of a 70/30 copolymer of vinyl pyrrolidone/vinyl alcohol was reacted at room temperature with 19.7 grams (0.1 mole) of p-toluene sulfonyl isocyanate in 250 milliliters of chloroform. After stirring for 20 hours at room temperature, the product (tosyl urethane of a vinyl pyrrolidone/vinyl alcohol copolymer) was precipitated by pouring the reaction mixture into pure hexane. The product was vacuum dried at 45° C. A yield of 31 grams was obtained and the product was soluble in n-propanol, n-butanol and a one normal sodium hydroxide solution.

Example 2

12.3 grams (0.05 mole) of cellulose diacetate was reacted at room temperature with 9.9 grams (0.05 mole) of p-toluene sulfonyl isocyanate in 180 milliliters of ethyl acetate. After stirring for 48 hours at room temperature, the product (cellulose diacetate monotosyl urethane) was precipitated by pouring the reaction mixture into pure hexane and vacuum dried at 45° C. A yield of 20.6 grams was obtained and the product was soluble in ethyl acetate, acetone, tetrahydrofuran and a one normal sodium hydroxide solution.

Following reaction with the monosulfonyl isocyanate, polymeric materials such as cellulose diacetate are soluble not only in alkaline solution but also in various organic solvents. While this characteristic is desirable for some uses, it may be undesirable for others. A polymeric material, such as cellulose diacetate, is soluble in organic solvent due to the presence of the acetate groups on the polymer chains so that the reaction with monosulfonyl isocyanate can be carried out in organic solvents. The product obtained from the reaction is also soluble in organic solvent due to the presence of the acetate groups. If desired, the reaction product may be treated to effect removal of these groups which confer organic solvent solubility while still maintaining alkaline solubility. In the case of sulfonyl isocyanate modified cellulose diacetate, the reaction product may be dissolved in alkaline solution and treated to effect removal of the acetate groups by hydrolysis to provide a material now insoluble in organic solvents but still soluble in alkaline solution as will be illustrated in Example 3.

Example 3

6 grams (0.0135 mole) of the product of Example 2 was dissolved in 60 milliliters of 10% sodium hydroxide solution (0.15 mole) and heated for 3 hours at 50–70° C. The product (cellulose monotosyl urethane) was precipitated by pouring the solution into water containing a small quantity of hydrochloric acid, washed and vacuum dried at 45° C. A yield of 3.1 grams was obtained and the product was soluble in two normal sodium hydroxide solutions but insoluble in common organic solvents such as anhydrous ethanol, N-butanol, acetone, ethyl acetate, tetrahydrofuran, monomethyl ether of ethylene glycol, dichloromethane, chloroform, benzene, dioxane, trichloroethylene, and ethanol/ethyl ether 1:1.

Thus, and in accordance with the present invention, there is provided a method of modifying hydroxyl or amine function polymeric materials by the reaction of the same with monosulfonyl isocyanate to provide side chains on the polymers which are acidic and which act to confer alkali solubility on the polymers and which are stable in alkaline solution. The method of the present invention may be accomplished under mild reaction conditions which may be harmful to heat sensitive polymeric materials. The polymers formed in accordance with the present invention are soluble in alkaline solution and are resistant to hydrolysis even after extensive contact with strong alkaline solutions.

Since certain changes may be made in the above product and process without departing from the scope of the invention herein involved, it is intended that all matter

What is claimed is:

1. An acidic polymer which is soluble in alkaline solution prepared by the process which comprises reacting a polymeric material containing hydroxyl or amino groups with a monosulfonyl isocyanate having the formula:

$$R-SO_2-NCO$$

wherein: R is selected from the group consisting of halogen, an alkyl radical of less than 10 carbon atoms, a halogen substituted alkyl radical, a phenyl radical, and alkyl substituted phenyl radical.

2. A polymer as recited in claim 1 wherein said R group is an alkyl substituted phenyl group.

3. A polymer as recited in claim 1 wherein said polymeric material is cellulose diacetate.

4. A polymer as recited in claim 3 wherein R is a methyl substituted phenyl group.

5. A polymer as recited in claim 1 wherein said polymeric material is cellulose.

6. A polymer as recited in claim 5 wherein R is a methyl substituted phenyl group.

7. A polymer as recited in claim 1 wherein said polymeric material is a copolymer of vinyl pyrrolidone and vinyl alcohol.

8. A polymer as recited in claim 7 wherein R is a methyl substituted phenyl group.

References Cited

UNITED STATES PATENTS

| | | | |
|---|---|---|---|
| 2,666,787 | 1/1954 | Krzikalla | 260—545 |
| 2,887,469 | 5/1959 | Unruh et al. | 260—77.5 |
| 3,311,608 | 3/1967 | Murphy | 260—212 |
| 3,330,848 | 7/1967 | Ulrich | 260—453 |

OTHER REFERENCES

Japanese Patent Specification Publication 38–16250, Aug. 29, 1963, 2 pages.

Journal of Paint Technology, volume 39, No. 508, pages 255–257, May 1967.

Textile Research Journal, volume 37, No. 5, pages 367–371, May 1967.

Ulrich: "The Chemistry of Sulfonyl Isocyanates," Chemical Reviews, volume 65, page 369 et seq. (1965).

DONALD E. CZAJA, Primary Examiner.

F. E. McKELVEY, Assistant Examiner.

U.S. Cl. X.R.

96—76; 117—161; 260—29.2, 212, 230, 294.8, 302, 309.2